United States Patent

Pieters et al.

[11] Patent Number: 5,173,945
[45] Date of Patent: Dec. 22, 1992

[54] PROCESS AND APPARATUS FOR ESTIMATING THE MOVEMENT OF A MOVING OBJECT

[75] Inventors: Bernard Pieters, Oinville; Patrice Deniau, Verneuil sur Seine; Jean-Pierre Merle, Orsay; Francis Devos, Orsay Cedex; Christophe Coquelet, L'Hay-les-Roses; Patrick Garda, Thiais, all of France

[73] Assignee: Aerospatiale Societe Nationale Industrielle, France

[21] Appl. No.: 635,857

[22] Filed: Dec. 28, 1990

[30] Foreign Application Priority Data

Dec. 28, 1989 [FR] France .................... 89 17326

[51] Int. Cl.$^5$ .............................. G06K 9/00
[52] U.S. Cl. ........................ 382/1; 382/18; 244/135 A; 244/161
[58] Field of Search .............. 244/135 A, 161; 356/141, 152; 250/203.6, 206.1, 206.2; 382/18, 61, 1

[56] References Cited

U.S. PATENT DOCUMENTS

| | | | |
|---|---|---|---|
| 4,047,816 | 9/1977 | Pell et al. | 356/152 |
| 4,497,066 | 1/1985 | Gasparri, Jr. | 382/18 |
| 4,668,089 | 5/1987 | Oshida et al. | 356/152 |
| 4,688,088 | 8/1987 | Hamazaki et al. | 382/18 |
| 4,744,664 | 5/1988 | Offt et al. | 356/375 |
| 4,753,569 | 6/1988 | Pryor | 250/206.2 |
| 4,825,393 | 4/1989 | Nishiya | 364/560 |
| 4,834,531 | 5/1989 | Ward | 244/161 |
| 4,982,188 | 1/1991 | Fodale et al. | 356/141 |

FOREIGN PATENT DOCUMENTS

| | | |
|---|---|---|
| 0122503 | 3/1984 | European Pat. Off. |
| 0211702 | 6/1986 | European Pat. Off. |
| 0330100 | 2/1989 | European Pat. Off. |
| 2018422 | 3/1979 | United Kingdom |

Primary Examiner—David K. Moore
Assistant Examiner—Barry Stellrecht
Attorney, Agent, or Firm—Hayes, Soloway, Hennessey & Hage

[57] ABSTRACT

A process and apparatus are provided for estimating the movement of a moving object relative to a reference object. A symbol is formed on the moving object, the symbol having a rectilinear contour with at least two parallel straight lines. The symbol is observed from the reference object and the movement is determined by means of successive projections along two axes having a relative rotary movement with respect to the recorded image of the symbol. The rotary motion is preferably at such a rate that it does not interfere with obtaining images of the straight lines.

16 Claims, 7 Drawing Sheets

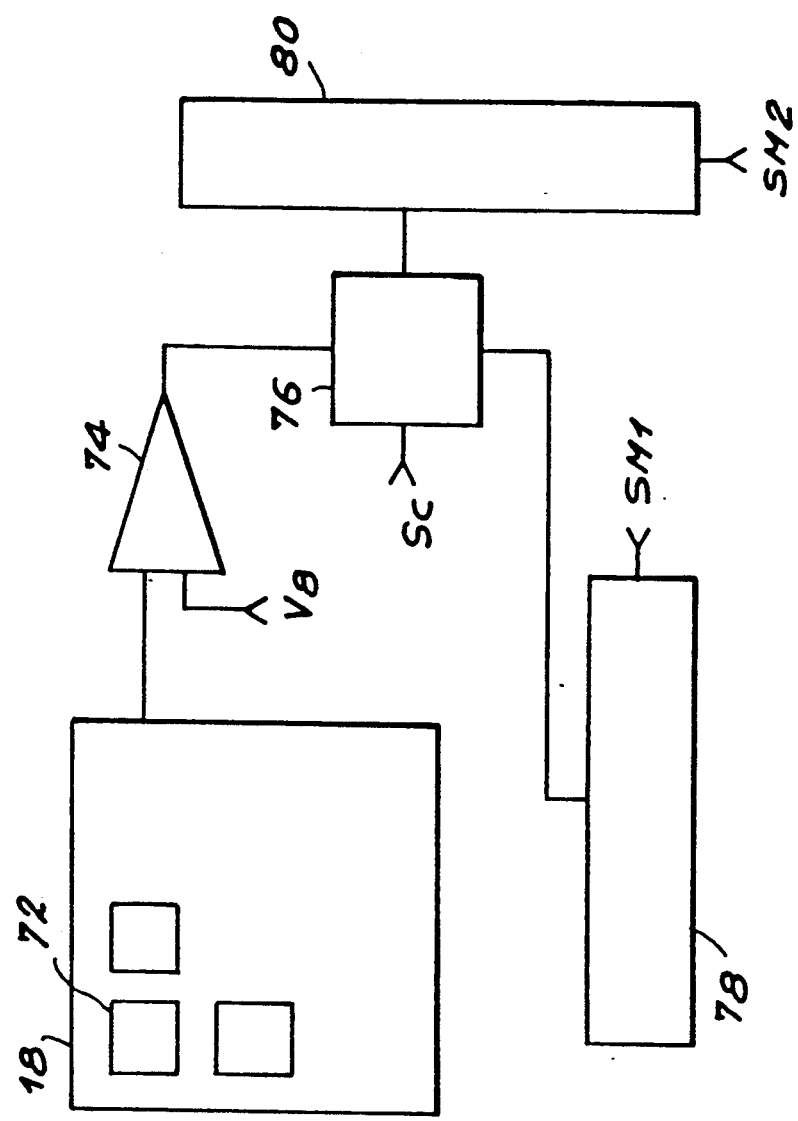

PROCESS AND APPARATUS FOR ESTIMATING THE MOVEMENT OF A MOVING OBJECT

FIELD OF THE INVENTION

The present invention relates to a process for estimating the movement of a moving body by observing a symbol formed on the latter and to apparatuses for performing this process. It more particularly applies to the real time observation of the jettisoning of an engine, booster or the like from a flying rocket or spacecraft, but also in robotics to the determination of the trajectory of an object.

BACKGROUND OF THE INVENTION

The real time estimation of the relative movement of subassemblies constituting a rocket during the jettisoning thereof makes it possible to check the satisfactory performance of operations. The knowledge of the disconnection margins and kinematic disturbances imparted to the jettisoned object conditions the mission, the performances and qualification of the launching systems. Therefore it is a question of determining the trajectory and attitude of the jettisoned object by means of on-board equipment.

In robotics, it is wished to check the displacement of a moving object in a complex environment in order to permit possible trajectory corrections.

The existing means such as observation by cine camera, direct measurements by wire, or observation by video camera in each case suffer from a certain number of disadvantages, such as inaccuracies and poor reliability of the measurements, large overall dimensions, need to recover the cine camera after jettisoning and the difficulty of processing the informations obtained.

SUMMARY OF THE INVENTION

The present invention obviates these disadvantages. It aims at making it possible to determine the movement of one object relative to another in a simple manner, whilst only requiring a small amount of informations to be transmitted from the detector permitting the observation of the object by processing said informations.

In the case of a jettisoning, the present invention makes it unnecessary to recover the jettisoned bodies and also the main body, the information being transmitted during the recording thereof.

More specifically, the present invention relates to a process for the estimation of the movement of a moving object relative to a reference mark linked with a reference object, characterized in that a symbol is formed on the moving object having a rectilinear contour with at least two parallel straight lines and comprising periodically acquiring an image with the aid of a camera integral with the reference object and for each acquisition projecting the image acquired onto at least two axes X and Y forming a projection reference of known position and orientation with respect to the reference mark and determining the maxima of each of these projections, maintaining a known relative rotation movement between the symbol and the projection mark at least between each acquisition, deducing from a succession of maxima of projections the orientation and position of the symbol relative to the reference mark and estimating the movement of the moving object relative to the reference mark from a succession of orentations and positions of the symbol.

In addition, the invention relates to an apparatus for performing this process, which comprises a means for forming a planar symbol with a rectilinear contour having at least two parallel straight lines on the moving object, whose movement is to be determined, an electronic camera located on a reference object, said camera having at least one detector supplying a signal representative of a recorded image, a means for performing a projection P(X) on the axis X along the axis Y and a projection P(Y) on the axis Y along the axis X of the image, said means supplying a signal representative of the projections P(X) and P(Y), a means for bringing about a relative rotation between the symbol and the projection mark and processing means connected to the electronic camera and able to deduce the orientation and position of the moving object at all times from the signal representative of the projections P(X) and P(Y).

In a preferred embodiment of this apparatus, the detector of the camera is of the type having an integrated retina with an array of processors. This retina comprises photosensitive cells arranged in matrix form. In order to carry out projections, accumulation cells connected to the end columns and rows of the matrix collect informations entered in each photosensitive cell of the retina.

The camera detector can also be constituted by an array of charge coupled devices arranged in row and column form.

Both the aforementioned detector types belong to the photodetector array category. Thus, all the detectors of this category can be used in an apparatus according to the invention.

In another embodiment of the apparatus, the camera detector is of the vidicon type.

Advantageously, the image is cleaned before carrying out projections. This cleaning has the effect of isolating the symbol from the background of the image.

The invention is described in greater detail hereinafter relative to non-limitative embodiments and the attached drawings, wherein show:

BRIEF DESCRIPTION OF THE DRAWINGS

FIG. 10 diagrammatically another embodiment of a detector, the cleaning and projection means according to the invention.

DETAILED DESCRIPTION OF PREFERRED EMBODIMENTS

Figure 1A:
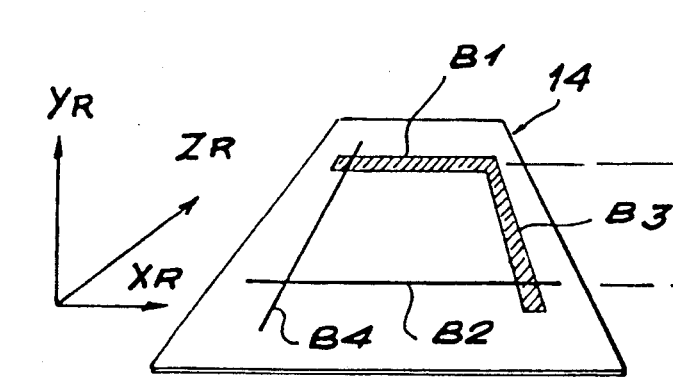
FIGS. 1A–1C diagrammatically the appearance of a symbol and its projections in two directions in space.

The process according to the invention makes it possible to determine the orientation and position of a moving object relative to a reference mark attached to a reference object. The knowledge of the successive orientations and positions makes it possible to track the movement.

The process can be subdivided into three main stages.

The first main stage consists of the acquisition by means of an electronic camera integral with the reference object of successive shots or photographs at a given speed.

According to the process, a symbol is formed on the moving object located in the observation field of the camera at a known position and orientation at the initial instant.

The symbol is planar and is e.g. constituted by four bars parallel in pairwise manner and intersecting so as to form a sharp. The dimensions of the bars are chosen so as not to be identical to one another, so as to asymmetrize the symbol.

The second stage involves projecting the image acquired on two axes X and Y, one projection P(X) being carried out on the axis X and along axis Y, whilst a projection P(Y) is carried out on axis Y and along axis Y. The axes X and Y form a known orientation and position projection mark with respect to the reference mark (XR, YR, ZR) linked with the reference object. At least between each acquisition, the symbol and the projection mark are given a known relative rotary movement with a speed between one tenth and ten revolutions or turns per second.

Advantageously, for each acquisition and before carrying out projections, the image obtained is cleaned. The term cleaning is understood to cover any type of image treatment process making it possible to isolate the symbol, which is the useful element of the image for the estimation of the movement, from the background, which is considered as measurement noise. Examples of cleaning are contour detection, masking or thresholding.

During thresholding, the values of the different pixels forming the image acquired are compared with a predetermined threshold and as a function of said comparison are brought to "0" (e.g. if the value of the pixel in question is below the threshold) or "1" (if the value of the pixel in question exceeds the threshold). This gives a highly contrasted acquired image having no intermediate grey level.

During masking, only part of the acquired image is taken into account in the subsequent treatment. The part to be taken into account is deduced from the preceding images and only that part of the image containing the symbol is utilized.

A contour detection makes it possible to estimate the image of the symbol freed from any continuous background in the case of a symbol having fine bars. In the case of a symbol having thick bars, in order to achieve the same result erosion, expansion or skeletonizing are used.

The combination of these three image treatment procedures makes it possible to improve the efficiency of the cleaning.

In the third main stage, the orientation and position of the moving object are determined at each instant as a result of these projections P(X) and P(Y), the knowledge of the relative rotary movement imposed between the symbol and the projection mark and the knowledge of an initial orientation and position.

Figure 1B:
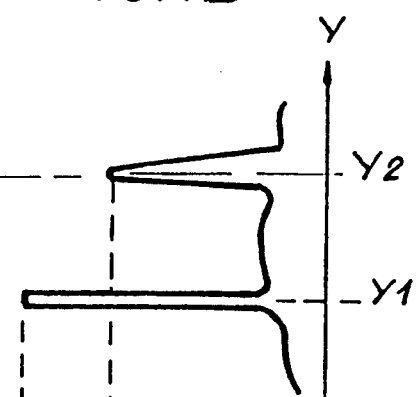
Figure 1C:
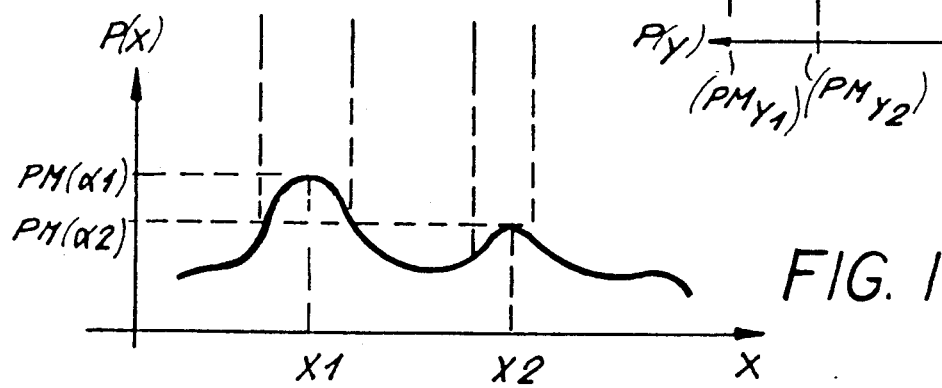

FIGS. 1A-1C diagrammatically shows the image of a symbol acquired in the plane of the camera detector and its projections along two directions X and Y in space. In this example, the symbol has undergone a forward tilt (i.e. towards positive ZR) with respect to the reference plane (XR, YR) containing the projection mark (e.g. detector plane).

In this example, the symbol is constituted by two first parallel bars B1 and B2, intersecting perpendicularly with two other parallel bars B3, B4, so as to essentially form an asymmetrical sharp. Thus, the bars B1 and B3 are wider and shorter than the bars B2 and B4.

In this example, it is considered that the image has undergone thresholding and the pixels where the symbol bars are recorded are equal to "1" and the others equal to "0". The projections P(X) and P(Y) correspond to the number of pixels of the detector of the camera equalling "1" in directions Y and X respectively.

The calculations of the projections intervening during each acquisition are considered as being instantaneous, because they have a negligible duration compared with the duration of an acquisition.

The projection P(X) on axis X and along Y has two "protuberances" corresponding to the bars B3 and B4, which have an apparent angle with the axis X as a result of the tilting of the symbol. In this projection, the bars B1 and B2 parallel to the axis X only give a quasi-uniform background.

The projection P(Y) on axis Y along axis X has two maximum amplitude peaks on a quasi-continuous background. The peaks correspond to the projections of the bars B1 and B2, which remain perpendicular to the axis Y during the tilting of the symbol. The continuous background is due to the projection of the bars B3 and B4.

For each recording determination takes place of the abscissas X1, X2, ..., Y1, Y2, ... and the values PM(X1), PM(X2), ..., PM(Y1), PM(Y2), ... from the maxima of the projections P(X) and P(Y).

In the represented example, each curve P(X) and P(Y) only has two maxima, but other maxima may appear due to measurement noise.

In the remainder of the process, these maxima not corresponding to an effective measurement are eliminated. As will be shown hereinafter, use is made of the fact that, as they are due to noise, they are not correlated with one another during time, unlike in the case of the maxima due to the bars of the symbol.

During the imposed rotation between the symbol and the projection mark, which is superimposed on any other relative movement between the moving object and the reference object, the projections P(X) or P(Y) came together in a peak when a bar is parallel to one of the projection directions Y or X respectively, the rotation movement being at a much higher speed than that of the moving object.

Figure 2A:
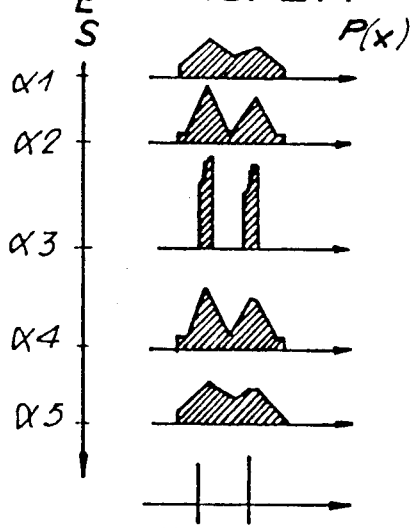
FIGS. 2A to 2C diagrammatically three sequences of successive projections in three symbol position and orientation cases.
Figure 2B:
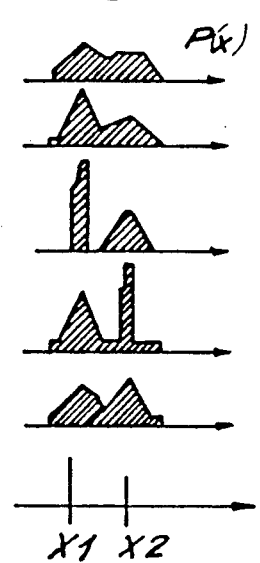
Figure 2C:
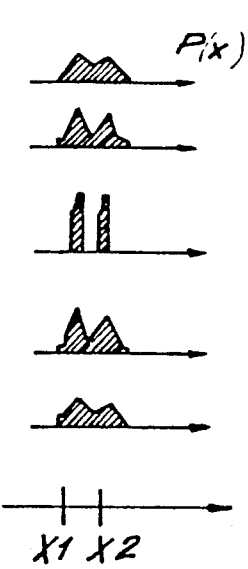

FIGS. 2A, 2B and 2C diagrammatically represent projection sequences P(X) during time and for three symbol position and orientation cases.

The successive instants of the recordings correspond to a sequence of known angles 1, 2, 3 etc. designating the relative rotation between the symbol and the projection mark. By projection, these angles are brought to angles designating the rotation relative to the reference mark.

FIG. 2A corresponds to the case where the plane of the symbol is parallel to the plane containing the projection mark. Two maximum amplitude peaks simultaneously appear for each quarter-turn of the symbol with respect to the projection mark. These peaks correspond to the fact that two bars are perpendicular to the axis X. Advantageously, the bars of the symbol are not identical. Thus, it is possible to establish which bars are responsible for the peaks by e.g. analyzing the relationship between their amplitude and their mid-height width.

FIG. 2B corresponds to the case where the plane of the symbol has undergone a tilt about an axis parallel to the axis X. The maximum amplitude peaks appear at different instants (i.e. for different angles). Thus, the tilt introduces a perspective and the bars perpendicular to the axis X have an apparent angle with the latter.

FIG. 2C corresponds to the case where the plane of the symbol is parallel to the plane containing a projection mark, but is further from the latter than in FIG. 2A. The maximum amplitude peaks therefore appear simultaneously once again and for the same angle as in 2A, but their amplitude is smaller and the value of the abscissas differs.

It is clear from the aforementioned three drawings, that the orientation and position of the symbol can be determined by knowing the relative rotary movement between the symbol and the projection mark and knowing the laws of perspective. Any tilt or inclination of the symbol leads to a delay in the appearance of the projection maxima on X and Y and the position is deduced from the position of the abscissas of the projection maxima on the axes X and Y and the amplitude of said maxima.

Figure 3:
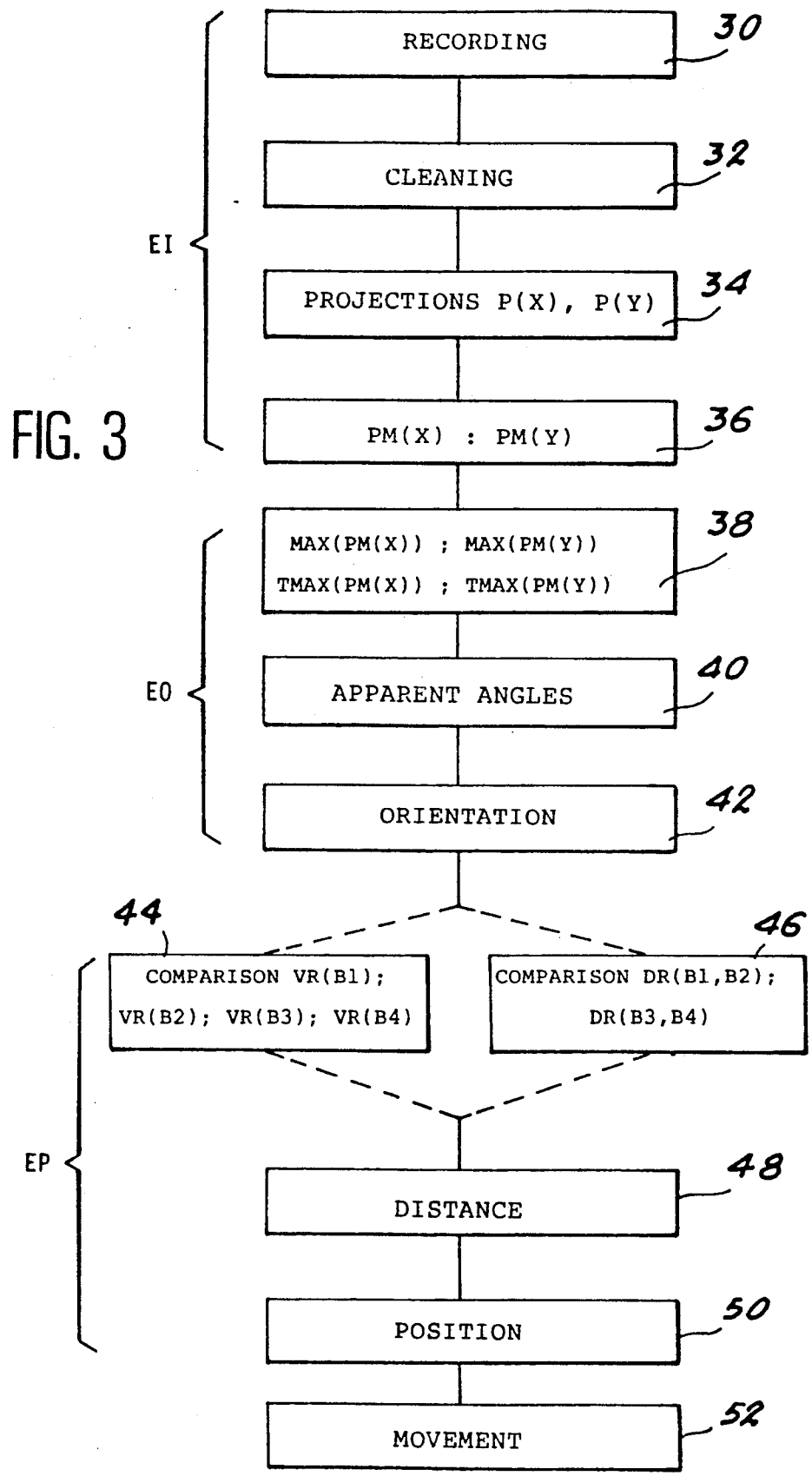
FIG. 3 a flowchart relating to the process according to the invention.

With reference to FIG. 3a more detailed description will now be given of the stages making it possible to estimate the movement of the moving object.

A distinction is made between three time scales in the process. The stages corresponding to a first time scale are grouped under the overall reference EI, which is repeated at the shooting speed. The latter is adapted to the relative rotary speed between the symbol and the projection mark, e.g. 1 Hz for a speed of 1 r.p.s.

EI comprises the following stages:
stage 30: acquisition of an image,
stage 32: cleaning said image,
stage 34: projecting said image onto two axes X and Y,
stage 36: determination of the maxima PM(X), PM(Y) of each of the curves P(X) and P(Y).

The following stages correspond to a second time scale and are carried out after acquiring a succession of images permitting the appearance of at least one projection peak corresponding to each bar of the symbol.

The overall reference EO groups the stages for the determination of the orientation of the symbol, whilst reference EP groups the stages for the determination of its position.

In order to determine the orientation of the symbol, the following stages are performed:
stage 38: by comparison between the successive maxima of each projection, determination takes place of the maximum values of these maxima PM(X), PM(Y) and the instants TMAX(PM(X)), TMAX(PM(Y)) at which they appear.

During time, it is possible to plot the evolution curve of said maxima PM(X) and PM(Y).

Figure 4:
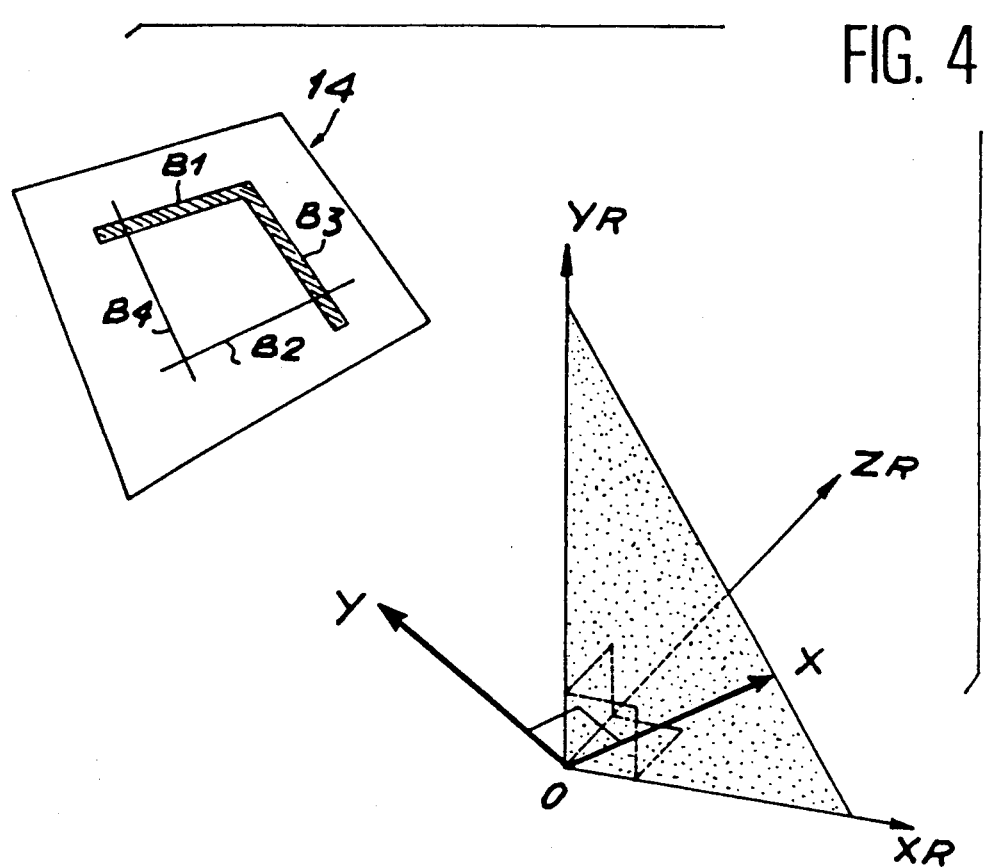
FIG. 4 diagrammatically a configuration of a symbol relative to the reference plane (XR, YR).

FIG. 4 diagrammatically shows a configuration of a symbol seen relative to the reference plane (XR, YR). In this example, the projection mark rotates with respect to the axis ZR, which coincides with the sight axis of the camera. The rotation speed of the projection mark is well above the displacement speed of the symbol. Therefore the symbol appears virtually motionless during numerous revolutions of the projection mark.

Figure 5:
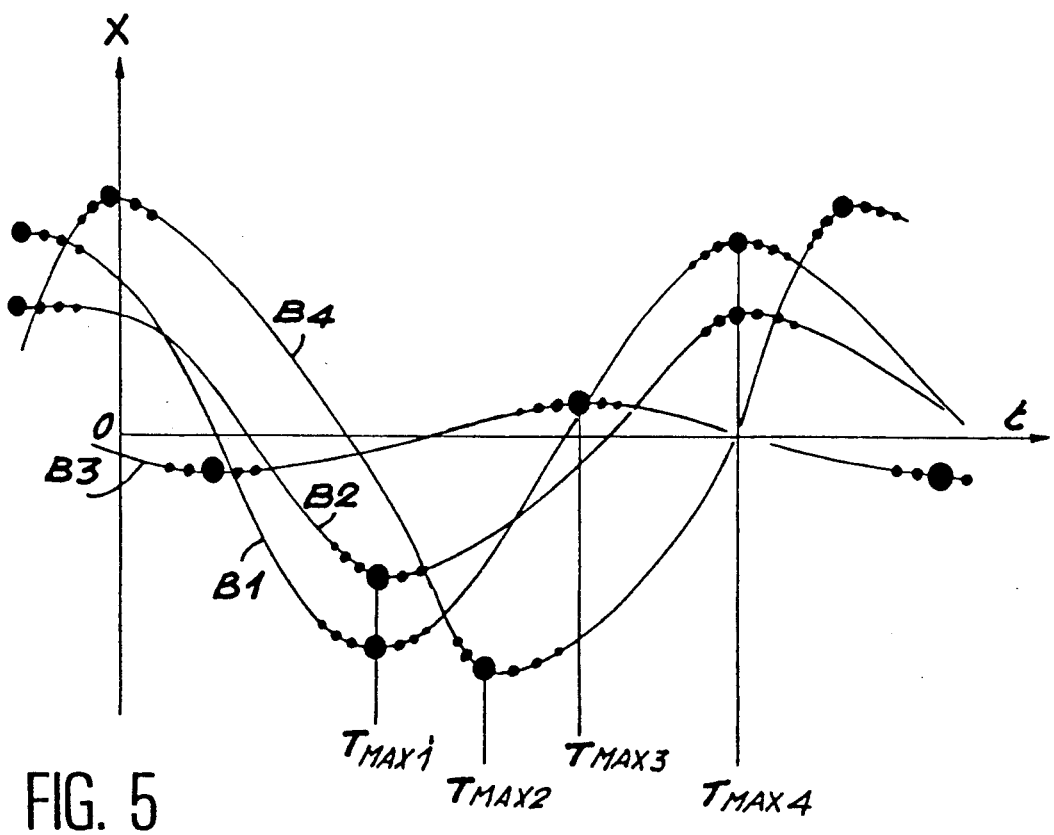
FIG. 5 diagrammatically a projection maxima evolution curve on the axis X as a function of time for the configuration of FIG. 4.

FIG. 5 diagrammatically shows an evolution curve of the projection maxima PM(X) for the four bars B1, B2, B3, B4 as a function of time and for the configuration of FIG. 4. Identical curves for projections on axis Y can be plotted in the same way.

Therefore the abscissas represent time and the ordinates the values of X where the projection peaks appear for different bars.

During the rotation of the projection mark, the curves essentially assume the appearance of sinusoids. However, only the points which appear around the maxima or minima of these curves are well defined and correspond to the formation of a peak for the considered projection. These points are represented with dimensions proportional to the amplitude of the peak in question. Outside these clearly defined points, the position on the axis X of the peaks (which then have a protuberance-like configuration) is delocalized and said points are not shown.

The maximum amplitude peaks represented by the largest points are located at the maxima and minima of the pseudo-sinusoids.

In the configuration shown in FIG. 4, the maximum values of the projection maxima for bars B1 and B2 appear simultaneously.

Between the appearance time TMAX1 of said maximum values at negative positions on the axis X and the appearance time TMAX4 of said values in positive positions on the axis X, the latter has performed a half-turn around the axis ZR.

The determination of the position on the axis X and the amplitude (dimension of the point) of the projection peaks during a half-turn makes it possible to determine the position and orientation of the symbol relative to the reference mark.

An example of such a determination is given hereinafter, but the measurement of these points supplies superfluous information regarding the state of the symbol.

The accuracy of the measurement requiring a half-turn rotation of the reference mark increases with the magnitude of the rotation speed of the reference mark compared with the displacement speed of the symbol.

Moreover, the study of the correlations between the points around the maxima of the pseudo-sinusoids makes it possible to distinguish the non-significant points due to the noise of the points corresponding in practice to the appearance of a peak on the projection axis.

Stage 40: the apparent angles between the bars and the axes X and Y are made to correspond at these times, said angles being known because the relative rotary movement between the symbol and the projection mark is known.

Thus, the knowledge of the imposed relative rotary speed between the projection mark and the symbol makes it possible to link with an angle each appearance time TMAX(PM(X)) or TMAX(PM(Y)) of a maximum projection value. This angle is the apparent angle formed by the bar in question with one of the axes XR or YR of the reference plane.

Stage 42: by knowing the apparent angles of each of the bars of the symbol, it is possible to deduce the orientation of the plane of the symbol relative to the reference mark.

To determine the position of the symbol in a first variant, the following stages are performed:

Stage 44: the maximum values from among the successive projection maxima PM(X) and PM(Y) are compared with given reference values VR(B1), VR(B2), VR(B3), VR(B4). These reference values can e.g. be measured prior to the jettisoning of the moving object and correspond to the values of the projection maxima for a known position of the symbol.

Stage 48: from this comparison is deduced the distance of the symbol from the plane containing the projection mark (i.e. its position projected onto an axis perpendicular to the projection mark).

Stage 50: the position of the symbol is deduced (i.e. its position projected onto the axes X and Y) by comparison between the abscissas of the maximum values of the projection maxima PM(X), PM(Y) on the axes X and Y and the reference abscissas XR1, XR2, YR1, YR2. On the basis of said informations concerning the position and distance from the projection mark, the position of the symbol relative to the reference mark is deduced.

According to another variant, stage 44 is replaced by the following stage 46:

Stage 46: the distances X and Y between two maximum values of the projection maxima PM(X) and PM(Y) corresponding to the detection of two parallel bars are compared with reference distances DR(B1, B2) and DR(B3, B4). These reference distances are measured prior to the jettisoning of the moving object and correspond to the distances separating the parallel bars B1, B2, B3 and B4 for a known position.

In another variant using a sharp-shaped symbol, advantage is taken of the fact that the centre of the symbol is positioned between two parallel bars. The position of the centre is then determined by forming the half-sum of the abscissas of the maximum values of the projection maxima along each of the axes X and Y. Therefore the orientation and position of the symbol (and therefore the moving object on which it is formed) are determined relative to the reference mark.

The third stage corresponds to a third time scale. It requires a succession of symbol orientation and position determinations and comprises:

Stage 52: deducing from a succession of symbol positions and orientations the movement (trajectory) of the moving object. As has been shown, each relative rotation half-turn between the projection mark and the symbol makes it possible to completely determine (position, orientation) the situation of the symbol relative to the reference mark. The relative rotation takes place at a much higher speed than the overall movement of the symbol, so that it can be considered that the estimation of the movement takes place in real time.

Figure 6:
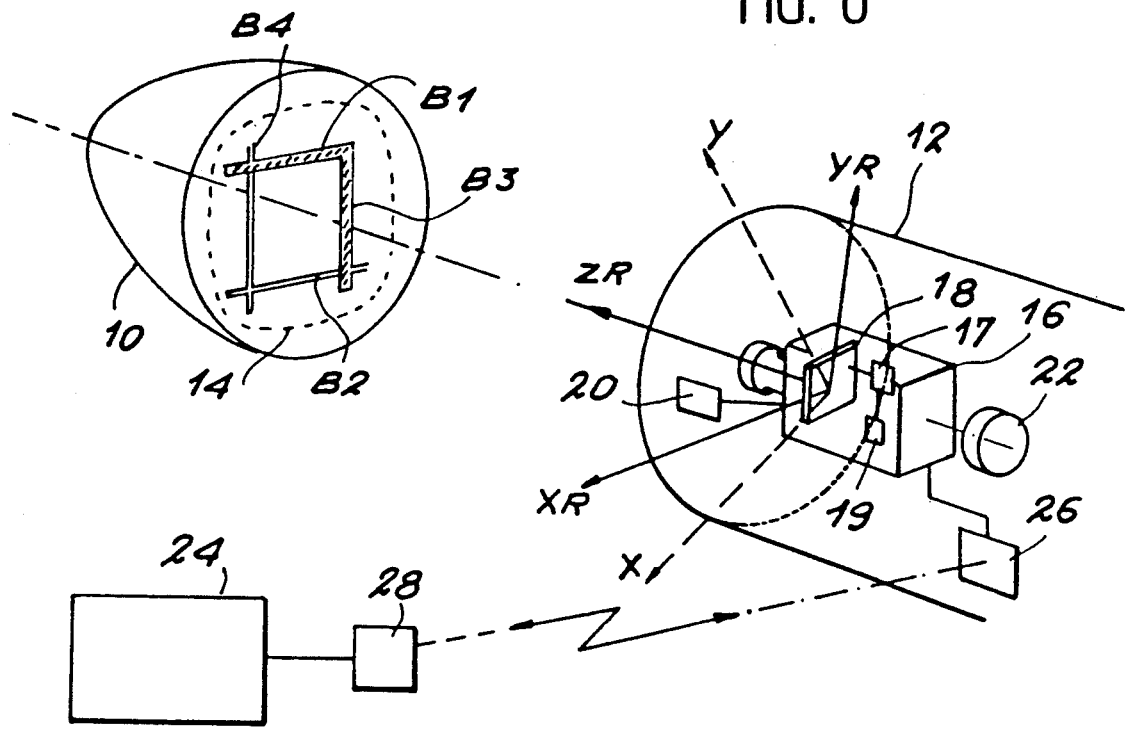
FIG. 6 diagrammatically a general view of an apparatus according to the invention.

A description will now be given of an apparatus making it possible to perform the above process. FIG. 6 diagrammatically shows such an apparatus applied to the jettisoning of a nose cone 10 from the launcher or rocket 12. In this case, it is a question of determining the movement of the cone 10 relative to the rocket 12 serving as the reference object.

The apparatus comprises a means for forming a planar symbol with a rectilinear contour having at least two parallel straight lines on the moving object 10, whose movement is to be determined. In FIG. 6 the said means is constituted by a sighting mark 14 (on which is shown the symbol) integral with the nose cone 10. The symbol is formed by four bars B1, B2, B3 and B4. Bar B1 is parallel to bar B2 and bar B3 is parallel to bar B4. The bars B1, B2, B3 and B4 intersect so as to roughly form a sharp. The lengths and widths of these bars are not identical, the bars B1 and B3, which are similar and perpendicular to one another are wider and shorter than the bars B2 and B4, which are similar and perpendicular to one another. The differences between the bars make it possible to distinguish them during movement and to remove uncertainties, such as e.g. a rotation direction.

In a not shown variant, the symbol is painted directly onto the moving object.

In another not shown variant, the symbol is constituted by part of the moving object 10 having an adequate contour.

An electronic camera 16 is located on the reference object, namely the rocket 12 in this case, so as to observe the symbol at least during the instants following jettisoning. The camera 16 comprises a detector 18 supplying a signal representing the image. The latter defines a plane coinciding with the plane produced by the axes X and Y of the projection mark. Advantageously, the plane formed by the axes XR and YR of the reference mark coincides with the plane containing the projection mark (plane of the detector 18) and the sighting axis of the camera 16 coincides with the axis ZR of the reference mark.

In preferred manner, prior to jettisoning, the sighting axis passes through the centre of the sharp on the sighting mark 14 and only the latter enters the observation field of the camera 16. The latter also has a cleaning means 17 for electronically cleaning the image acquired. This means 17 supplies a signal representing the cleaned image. The electronic cleaning makes it possible to only retain the significant part of the image, namely the symbol, whilst eliminating the background.

The camera 16 also comprises a means 19 for carrying out projections of the image which has been acquired and cleaned, namely a projection P(X) on axis X and along axis Y and a projection P(Y) on axis Y along axis X.

Optionally, a lamp 20 illuminates the sighting mark 14. The lamp 20 can be of the flash type and in this case it is synchronized with the shooting speed. The shortness of the flashes makes it possible to avoid movement during the formation of an image.

Advantageously, in order to assist its detection, the symbol is produced with a retroreflecting material. As the jettisoned object moves away from the reference object, the sighting mark 14 receives an ever smaller amount of light from the lamp 20. The use of retroreflecting material makes it possible to maintain luminance of the symbol at a substantially constant level despite the increasing distance. In this case, the lamp is positioned in the vicinity of the camera.

The camera 16 takes photographs at a regular speed. The informations corresponding to the projections of each image acquired and cleaned are transmitted to analysis and processing means 24, e.g. a computer or microcomputer.

In the example shown in FIG. 6, for economic and weight reasons, the rocket 12 does not have a computer, the informations being transmitted in digital form by a transmitter-receiver 26, which transmits radio-frequency waves. These waves are intercepted on the ground by a transmitter-receiver 28 connected to the computer.

The symbol and the projection mark have a known relative rotary movement, which can result from a natural rotary movement of the jettisoned object rotating on itself. The rotary movement can also be artificial and a motor 22 integral with the camera 16 makes it possible to rotate the latter about the sighting axis ZR, thereby rotating the projection mark.

In another variant, the relative rotary movement is only due to the rotation of the projection axes X and Y. As will be shown hereinafter, said rotation is brought about electronically.

Figure 7:
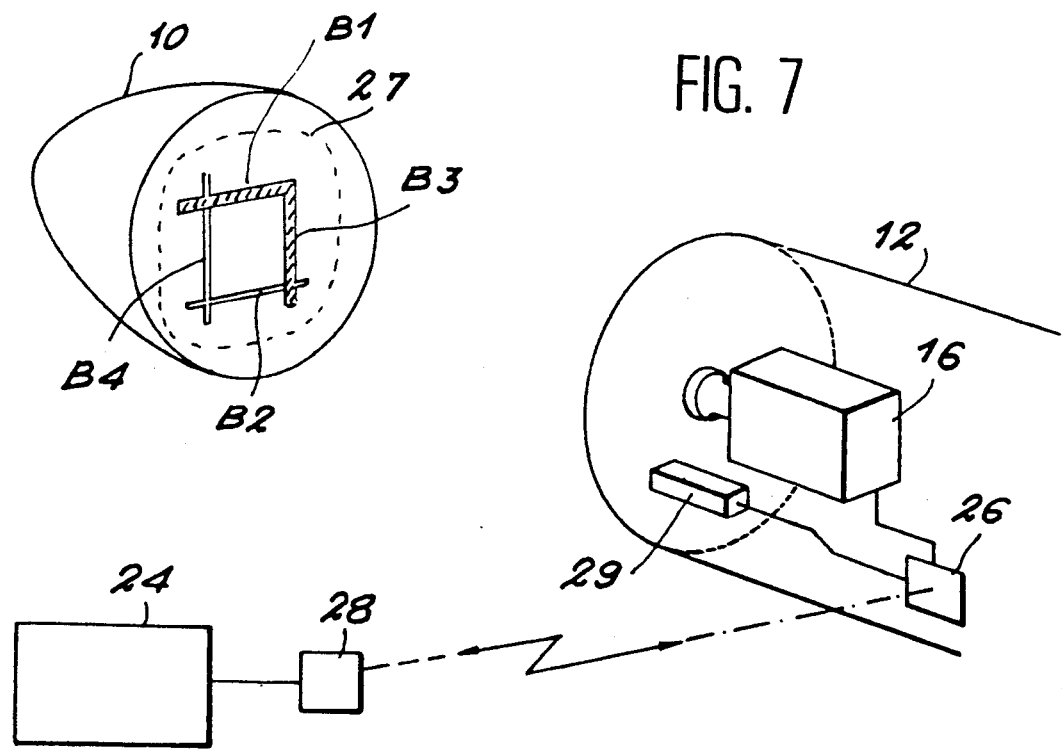
FIG. 7 diagrammatically a general view of a constructional variant of an apparatus according to the invention.

FIG. 7 diagrammatically shows a variant of an apparatus according to the invention. In this case a laser 29 emits a light beam in the direction of the moving object 10. The laser 29 is such that the light beam projects the symbol onto the moving object 10 due to its displacement and by adequate intensity variations. The displacement of the beam is sufficiently fast to ensure that the camera 16, by detection integration, only sees the complete symbol and not portions thereof. In this case, the relative rotary movement between the symbol and the projection mark is obtained by rotating the light projection or design.

The symbol created in this way by the beam is highly luminous and the design or projection can be active. The laser 29 controlled by the computer 24 to which it is connected via transmission means 26, 28 can e.g. adjust the size of the symbol as a function of the distance from the moving object 10 and in general terms can adapt the design to the experimental conditions.

Advantageously, a catadioptric, diffusing surface 27 placed on the moving object 10 makes it possible to reflect light in the direction of the camera.

In this variant, it is clear that the flash lamp 20 is not necessary and is not shown on FIG. 7.

Figure 8:
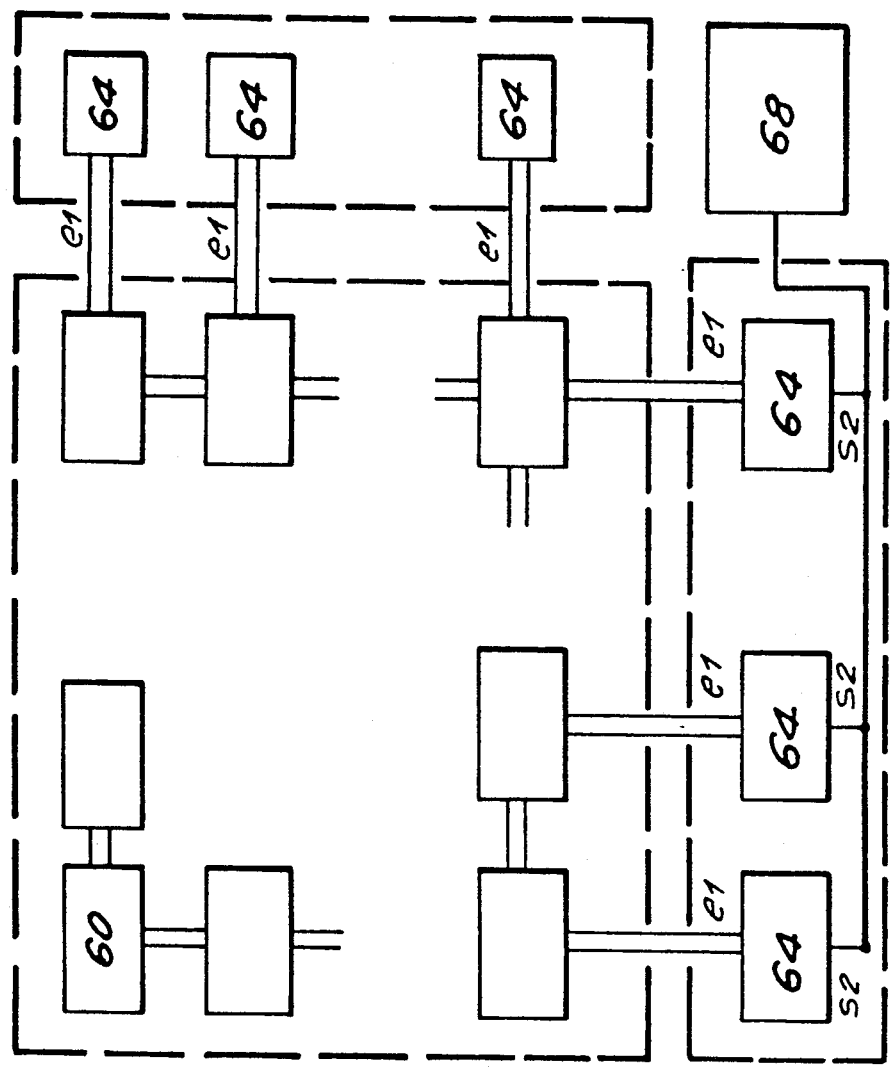
FIG. 8 diagrammatically a first embodiment of a detector, cleaning and projection means according to the invention.

FIG. 8 diagrammatically shows a first embodiment of the detector and the cleaning and projection means. The camera detector 18 is of the type having an integrated retina with an array of processors. Such a retina is described in French patent application 2 583 602 filed on Jun. 18, 1985. It is constituted by an array of cells 60 formed on the same substrate and whereof a more complete description is given hereinafter. At present it is merely necessary to know that these cells 60 forming the pixels of the detector 18 comprise a photosensitive element supplying a signal representing one element of an image formed on the retina, an element for converting said signal into binary information and means for storing the binary information organized as a bidimensional network of shift registers in order to permit the transfer of binary information from one cell to a random adjacent cell. The cells 60 are arranged in the form of rows and columns. As will be described hereinafter such cells 60 have the recorded image cleaning means.

The projections P(X) and P(Y) are carried out by two series 62, 66 of accumulation cells, which can be digital or analog. In the first series 62 for carrying out the projection P(X), each of the accumulation cells 64 is connected by an input E1 to a different cell 60 of the detector 18 and belonging to an end row. The second series 66 of accumulation cells 64 permits the projection P(Y) on axis Y and along axis X. Each of these accumulation cells 64 is connected by an input E1 to a different cell 60 of the detector 18 and belonging to an end column.

On an output s2, each accumulation cell 64 supplies an electrical signal proportional to the number of cells 60 having been excited on the corresponding row or column.

The outputs s2 of the accumulation cells of the first series 62 are connected to one another and to an input of a circuit 68 permitting an integral measurement of the number of excited pixels of the detector 18 (in an equivalent manner the accumulation cells of the second series can be used). This measurement can e.g. be used for regulating the exposure time of the detector 18 to the light intensity present.

The cells 60 have not shown control inputs for controlling the displacements of the values of each pixel to adjacent accumulation cells 64. The accumulation cells have not shown control inputs for initiating charge accumulation after the exposure of the detector 18.

Such a detector of the retina type with a processor array having accumulation cells for carrying out projections makes it possible to electronically turn the projection axes. This can be obtained by an adequate number of successive shifts of the binary informations contained in the cells 60.

Figure 9:
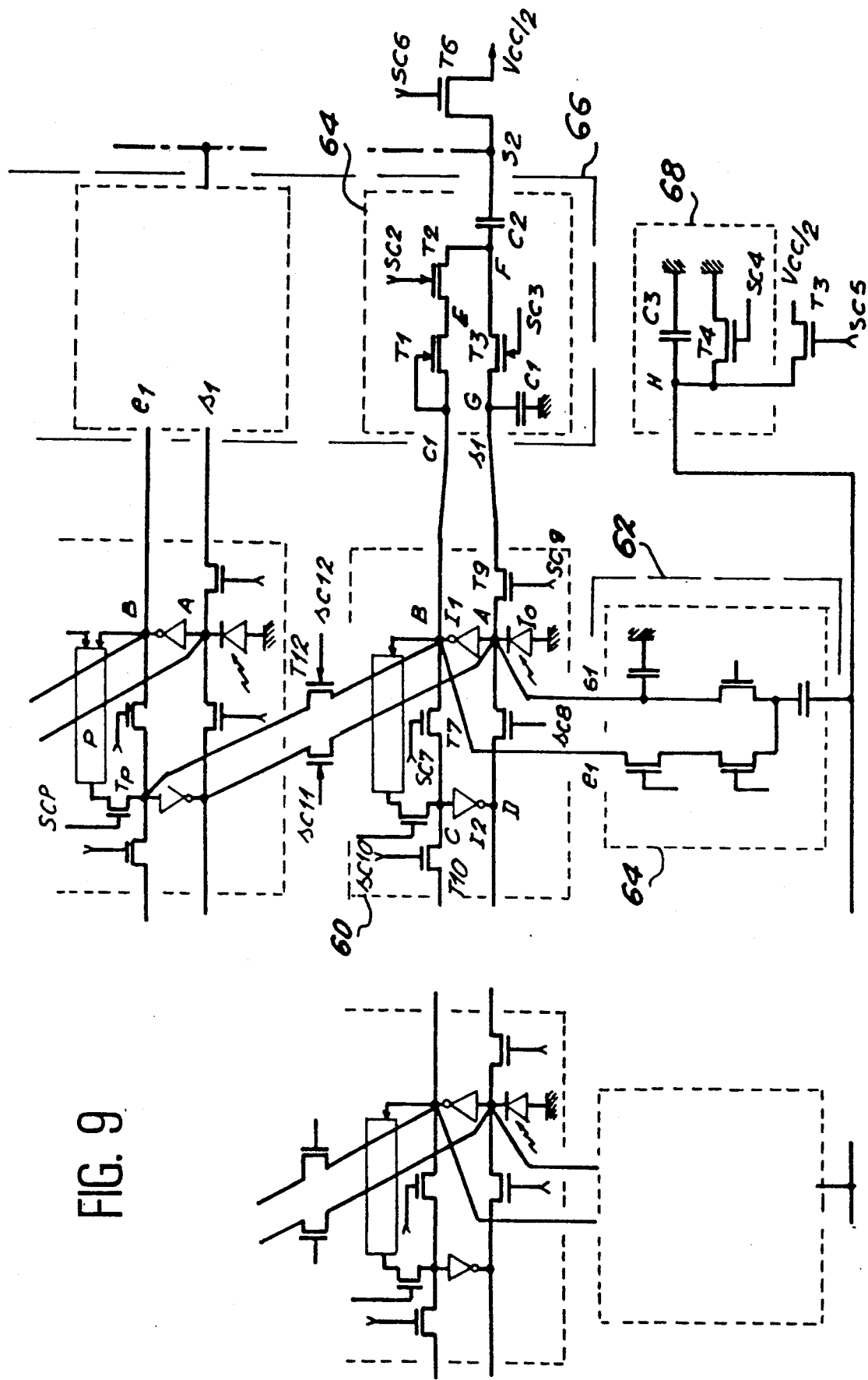
FIG. 9 diagrammatically a partial view of the apparatus of FIG. 8.

FIG. 9 is a partial view of the preceding embodiment, where a cell 60 can be seen in detail. The cell comprises a photosensitive element 70 advantageously constituted by a photodiode. The said element 70 supplies a voltage at point A, which is representative, at the end of the exposure time, of the value of the pixel constituted by the cell 60.

The voltage at point A is applied to an analog-digital conversion and storage circuit incorporating an inverter I1 connected between point A and point B for connecting two transistors T7, T8, whose output circuits are respectively connected between point B and point C and between point A and point D and a second inverter I2 connected between points C and D.

The inverter I1 constitutes an analog-digital converting element converting the voltage at point A into a binary information assuming the value "0" or the value "1", as a function of whether the voltage at point A is above or below the predetermined inverter operating threshold. The binarization of the pixel is consequently carried out by thresholding. Thus, the converter means clean the recorded image by thresholding.

With the transistors T7, T8, the inverters I1, I2 constitute a storage circuit for the binary information obtained by conversion of the voltage at point A.

The storage circuits are organized into a bidimensional network of shift registers. The cells are connected in rows by transistors T9, T10, which respectively connect the points B and A of a cell to the points C and D of the adjacent cell to the right, as well as columns by the transistors T11, T12, which respectively connect the points D and C of a cell to the points A and B of the adjacent cell below.

The information transfer is controlled by means of control signals sc7, sc8, sc9, sc10, sc11, sc12 applied to the transistors T7, T8, T9, T10, T11, T12. Thus, a shift to the right is controlled by closing T10 and T8 and a shift to the bottom by closing T7 and T11, etc.

Each cell 60 of the retina also has an elementary processor P connected at the output to a transistor TP connected to point C and also connected by a data input to point B.

The processors P constitute another cleaning means. Thus, it makes it possible to carry out at random a masking, a contour detection or any other image processing.

In this embodiment, the accumulation cells 64 are of an analog nature. Apart from their charge integration function, they permit a comparison with a given threshold value. The cells 60 belonging to an end column and row of the network are in each case connected to an analog accumulation cell 64. The input e1 of the accumulation cell is connected to point B of the cell 60 corresponding thereto.

A transistor T1 is connected to the input e1 and also to the connection point E. This transistor T1 is wired in such a way that it serves as a resistive diode. Two transistors T2, T3 are respectively connected between the connection points E, F and F, G. These transistors serve as switches controllable via control signals sc2 and sc3 respectively applied thereto. One electrode of a capacitor C1 is connected to point G, whilst its second electrode is raised to earth or ground potential.

The point G is connected to a first output s1 of the accumulation cell 64. Said output s1 is connected to point A of the corresponding cell 60 via the transistor T9. A second capacitor C2 is connected to point F on the one hand and to a second output s2 of the accumulation cell on the other.

The outputs s2 of the accumulation cells 64 of the first series 62 (respectively of the second series 66) are interconnected and raised to a voltage Vcc/2 (in which Vcc is the supply voltage of the retina and equal e.g. to 5 V) across a transistor T5 (respectively T6) controlled by a control signal sc5 (respectively sc6.)

The transistors T1, T2 and the capacitors C2 form an integrator. The transistor T3, the capacitors C1, C2 and the inverter I1 of the corresponding cell 60 form a comparator.

In the range of voltages between Vcc and Vcc/2, in order to bring about the recording of the analog voltage accumulated at the terminals of C1, the control of T3 must be below said accumulated voltage by a predetermined threshold value. By successively testing regularly decreasing threshold values and recording the signal supplied at s1 in the cell 60 corresponding to each test, successive amplitude sections of the profile of the projections are obtained, the signal supplied by s1 being thresholded on each occasion that it penetrates the cell 60.

In order to analyze the voltage range Vcc/2, OV, use is made of the "bootstrap" effect on all the capacitors C2, obtained by making transistors T5 and T6 conductive.

The sections of the profile of the projections are therefore successively recorded in the cell 60 of the end row and end column of the detector 18. These informations are sequentially supplied to an output of the detector 18 and are in digital form so as to be easier to process than the analog informations available at the analog accumulation cells.

The circuit 68 for the integral measurement of the pixel number having the value "1" comprises a transistor T4 connected in parallel to a capacitor C3 between the connection point G and earth or ground. The transistor T4 is controlled by a control signal sc4.

According to a variant of this embodiment using an integrated network retina, the analog accumulation cells can be replaced by numerical counters, whose capacity is equal to $\log_2 n$, in which n is equal to the number of rows and columns (for a square retina), n being a power of 2. They can advantageously be in a single shift register for outputting the accumulated results, i.e. of the scan path type.

FIG. 10 diagrammatically shows another embodiment of a detector and the cleaning and projection means. The camera detector 18 in this case is constituted by an array of charge coupled devices 72, which are arranged in row and column form (or any other photodetector array type).

Each charge coupled device 72 corresponds to a pixel of the detector and supplies on an output an analog electric signal representing the illumination received by the pixel.

In the represented embodiment, the cleaning means is a thresholding means. A threshold element 74 supplies in sequence on a first input, the electric signals of each cell 72 of a row and this takes place row by row.

The analog electric signal corresponding to the value of the pixels is digitized to form a binary information assuming the value "1" if its amplitude exceeds a threshold value Vs or the value "0" if its amplitude is below said value Vs.

A counter 76 is connected to the output of the threshold element sequentially supplying the binarized value of the pixels. Said counter is controlled by a control signal sc permitting its sychronization with the operating speed of the threshold element 74.

A first and a second memories 78, 80 connected to the counter have in each case the same number of registers as the charge coupled device array 72 has columns and rows.

For each recording in the counter 76 of a new value corresponding to a pixel of the detector 18, the memory 78, controlled by the signal SM1, supplies the counter 76 with the number stored in the register corresponding to the column where the pixel is located. This number is added to the value and the result is stored in the same register. For projecting on the row, an analog operation is carried out by the memory 80 controlled by the control signal SM2.

When all the pixels have been read, the projections P(X) and P(Y) are contained in the memories 78 and 80. The memories are then sequentially read and the informations contained therein are transmitted to the computer for processing.

In another embodiment the detector 18 is of the vidicon type. The cleaning and projection means are constructed in the same way as for the charge coupled device detector.

Thus, according to the invention, the movement of a moving object separating from a body can be tracked and followed in real time. The signal carrying the useful information for this determination is preprocessed, so as to reduce the information quantity transmitted to the processing means.

We claim:

1. Process for estimating the movement of a moving object relative to a coordinate system (XR, YR, ZR) linked with a reference object characterized in that a symbol is formed on the moving object having a rectilinear contour with at least two parallel straight lines and comprising periodically acquiring an image with the aid of a camera integral with the reference object and for each acquisition projecting the image acquired onto at least two axes X and Y forming a projection reference of known position and orientation with respect to the coordinate system (XR, YR, ZR) and determining the maxima of each of these projections, providing a known relative rotation movement between the symbol and the projection of the image of the mark at least between each acquisition, deducing from a succession of maxima from projections the orientation and position of the symbol relative to the coordinate system (XR, YR, ZR) and estimating the movement of the moving object relative to the coordinate system (XR, YR, ZR) from a succession of orientations and positions of the symbol.

2. Process according to claim 1, characterized in that before projecting the image acquired, the latter undergoes a cleaning treatment.

3. Process according to claim 1, wherein the determination of the orientation of the symbol with respect to the coordinate system (XR, YR, ZR) comprises determining the instants where these values are at a maximum by comparison between the values of the maxima of the successive projections, bringing about correspondence at these instants of the apparent angles between the straight lines belonging to the contour of the symbol and the axes (X, Y) of the projection axes and deducing therefrom the orientation of the symbol with respect to the coordinate system (XR, YR, ZR).

4. Process according to claim 1, wherein the determination of the position of the symbol with respect to the coordinate system comprises comparing the distance between the abscissas of the maximum values of the projection maxima along one of the axes X or Y corresponding to two parallel straight lines constituting the contour with a predetermined coordinate distance, deducing therefrom the distance between the symbol and the projection mark and deducing the position of the symbol from the coordinate system on the basis of abscissas of the maximum values of the projection maxima on the axes X and Y and the distance of the symbol from the projection axes.

5. Process according to claim 1, wherein the determination of the position of the symbol relative to the coordinate system comprises comparing the maximum values of the maxima of a same projection with predetermined coordinate values, deducing therefrom the distance between the symbol and the coordinate system (XR, YR, ZR) and deducing the position of the symbol from the coordinate system on the basis of the abscissas of the maximum values of the projection maxima on the axes X and Y.

6. Apparatus for estimating the movement of a moving object relative to a coordinate system linked with a reference object, and comprising, a means for forming a planar symbol with a rectilinear contour having at least one pair of parallel straight lines on the moving object whose movement is to be determined, an electronic camera located on the reference object, said camera having at least one detector supplying a signal representative of a recorded image, a means for performing a projection P(X) on the axis X along the axis Y and a projection P(Y) on the axis Y along the axis X of the image, said means supplying a signal representative of the projections P(X) and P(Y), a means for bringing about a relative known rotation between the symbol and the projection axes, and processing means connected to the electronic camera and able to deduce the three axis orientation and position of the moving object at all times from the signals representative of the projections P(X) and P(Y).

7. Apparatus according to claim 6, wherein the camera also has a means for cleaning the acquired image and is connected to the detector and supplies a signal representing the cleaned image.

8. Apparatus according to claim 6, wherein the means for forming the symbol on the moving object includes a laser located on the reference object supplying a light beam projecting the symbol onto the moving object (10).

9. Apparatus according to claim 6, characterized in that the symbol is formed by four bars (B1, B2, B3, B4), which are parallel in pairs and intersect so as to essentially form a sharp.

10. Apparatus according to claim 9, wherein said symbol includes bars (B1, B2, B3, B4) having dimensions permitting the discrimination thereof.

11. Apparatus according to claim 6, further comprising a means for giving a relative rotary movement to the symbol and the camera.

12. Apparatus according to claim 6, further comprising a flash lamp synchronized with the shots taken by the camera and located on the reference object.

13. Apparatus according to claim 6, incorporating an integrated measuring system supplying on an output a signal proportional to the number of excited pixels of the detector.

14. Apparatus according to claim 6, wherein the detector is constituted by an integrated retina with a processor array having photosensitive cells arranged in matrix form.

15. Apparatus according to claim 14, wherein the cleaning means is in the form of the integrated retina with the processor array serving as the cleaning means.

16. Apparatus according to claim 13, wherein the means for carrying out the projections is constituted by a first series of accumulation cells respectively connected to the photosensitive cells of an end row of the matrix and by a second series of accumulation cells respectively connected to the photosensitive cells of an end column of the matrix, each accumulation cell supplying on an output a signal corresponding to the number of excited photosensitive cells on the row or column to which it is connected.

* * * * *